Sept. 15, 1925.

A. G. DE NORTHALL

SAW 1,553,672

Original Filed Feb. 10, 1920

INVENTOR
Adrian G. de Northall
BY
ATTORNEY

Patented Sept. 15, 1925.

1,553,672

UNITED STATES PATENT OFFICE.

ADRIAN G. DE NORTHALL, OF LOS ANGELES, CALIFORNIA, ASSIGNOR TO A. G. DE NORTHALL, INCORPORATED, A CORPORATION OF INDIANA.

SAW.

Application filed February 10, 1920, Serial No. 357,599. Renewed September 27, 1922. Serial No. 591,004.

*To all whom it may concern:*

Be it known that I, ADRIAN G. DE NORTHALL, a subject of the Kingdom of Great Britain, residing in the city of Los Angeles, county of Los Angeles, and State of California, have invented certain new and useful Improvements in Saws, of which the following is a specification.

My invention relates to saws, and more particularly to an endless sawing element, supported and driven at its looped ends, with its intermediate portions moving in opposite directions, in contiguous relationship to each other, through the cut or kerf being made thereby. Among the other objects of my invention is to provide in a sawing device of the character referred to improved means at the ends or loops of such a saw for supporting and driving the same; to provide a saw of the character referred to made up of saw sections interlocked together, in the form of a chain, whereby said saw can be driven around a guiding and holding element; to provide a saw of the character referred to adapted to be driven by means of suitable driving sprockets having interfitting connections with said saw.

Other objects and advantages will appear from the following description of one embodiment of my invention, taken with the accompanying drawings, in which,—

Figure 3:
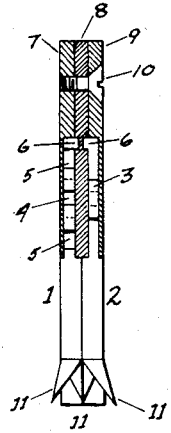
Figure 3 is a cross sectional view thereof, taken on line 3—3 of Figs. 1 and 2.

Referring now more in detail to the drawings, I will describe the embodiment of my invention here shown for illustrative purposes. 1 and 2 designate saw sections, pivotally interlocked together as at 3 and 4, in the same plane, said saw sections being recessed on their outer sides and channeled on their inner sides as shown in Figure 3, and being provided with sprocket openings, 5, to receive the sprocket teeth of a sprocket hereinafter again referred to. The saw sections can be of any desired length and form, with any desired form of saw teeth. At their base ends, on their channeled inner sides, said saw sections are provided with inturned lip or lug portions, 6, 6, which fit and move in corresponding grooves or channels in a plate 8, having secured to its opposite sides holding and guiding plates or members 7 and 9 overlapping the recessed outer sides of said saw sections, as clearly indicated in Fig. 3, said members 7 and 8, and 9 being secured together by means of screws, 10. The teeth of the saw sections are designated 11.

At each end of the holding and guiding plates or members, 7, 8 and 9, are suitable casings, or housings, designated 13 and 14, covering the saw teeth, and within or through which housings, respectively, are shafts, 15 and 16, provided with suitable saw driving and guiding sprockets, 17 and 18, the sprocket teeth of which are positioned to enter the openings 5, 5, in the saw element as it enters the housings. Any suitable motor power can be used for driving the sprocket shafts and sprockets which drive the saw element. Handles 12, 12 are provided on said casings.

The inside of said casings or housings are adapted to form guides and protections for the saw element as it moves around the sprockets, and any suitable guiding means may be used therein.

Figure 4:
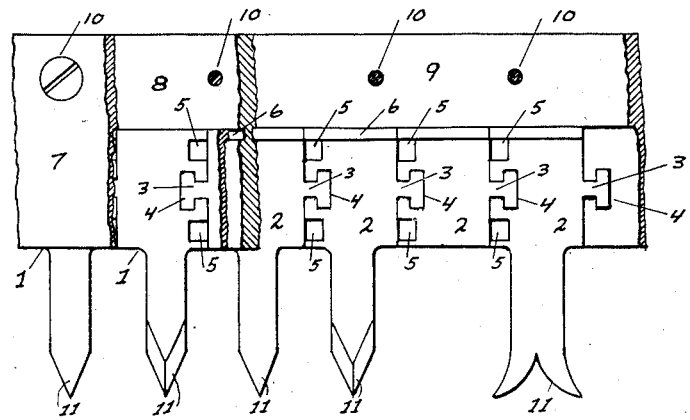
Figure 4 is a fragmentary, side elevation, with portions broken away to show the construction and arrangement of the sawing element.
Figure 2:
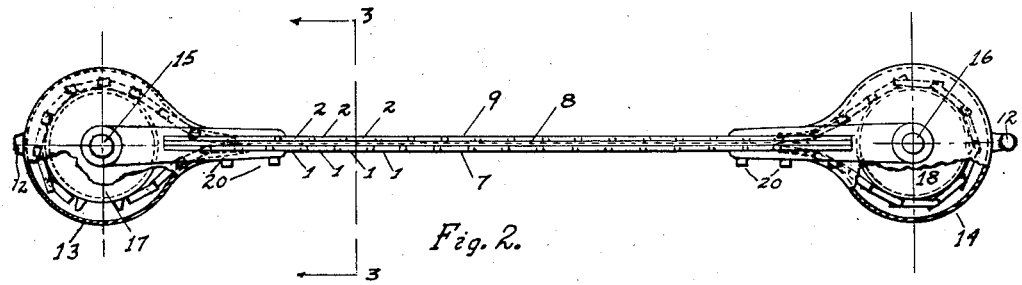
Figure 2 is a plan view thereof.
Figure 1:
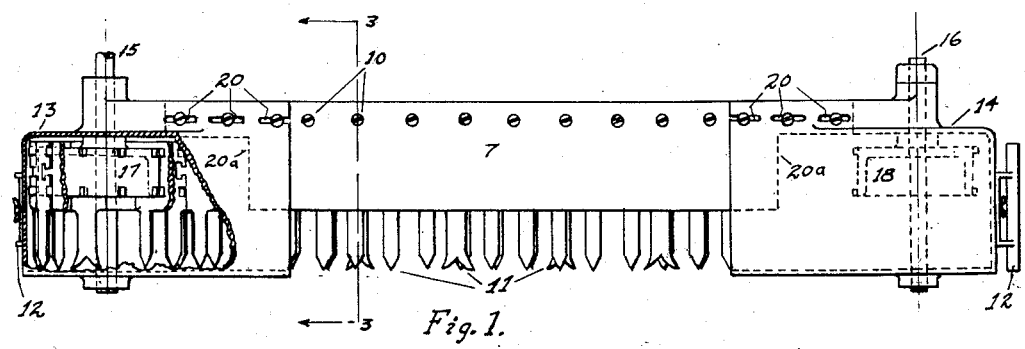
Figure 1 is a side elevation of a saw embodying my invention.

It will be noted that the combined thickness of the side plates or holding elements, 7, 8 and 9, is the same as the thickness of the saw teeth, and that the entire structure, as represented in Figs. 3 and 4, being the middle or intermediate portion of the device, enters the cut or kerf made by the teeth. It will also be apparent that the two laps of the sawing element, move in opposite directions. The casings or housings, 13 and 14, are secured to the side plate members, 7 and 9, as at 20, and are cut away on the inside, as indicated by the dotted lines 20ª, 20ª, Fig. 1, to facilitate the entrance of the endless sawing element into said casing and around the sprockets. The casings, or housings, 13 and 14, are adjustably connected to the opposite ends of the holding and guiding means, 7, 8 and 9, by means of slots at 20, whereby to provide for certain adjustments in getting the right tension on the endless sawing element.

While I have shown and described one embodiment of my invention, for illustrative purposes only, I am aware that many changes can be made in the details of construction and arrangement, involving only mechanical skill, and I do not, therefore, limit my invention to the details shown and described for purposes of illustration, except as I may be limited by the hereto appended claims.

I claim:

1. A saw of the character referred to comprising an endless saw made up of a series of short saw blade sections having interlocking pivotal connections with each other within the plane of the saw blade, guiding plates overlapping the opposite sides of the body part of said saw sections and holding them in interlocked connection with each other and driving means around which said endless saw loops, substantially as described.

2. A saw of the character shown and described comprising an endless saw blade consisting of a series of short saw blade sections pivotally connected together, the connection lying between the opposite edges of the blade, side plates on the opposite sides of the body portions of said saw blade sections, housings at the opposite ends of said side plates, and driving and guiding means within said housings for driving said saw, substantially as described.

3. A sawing device of the character referred to comprising an endless sawing element, relatively fixed guiding means overlapping both sides of the body of the middle or intermediate portions of said sawing element, suitable housings or casings secured to the opposite ends of said guiding means, driving means in said housings for driving said endless sawing element, and means for connecting a source of power therewith.

4. A sawing device of the character referred to comprising an endless sawing element, relatively fixed guiding means for the intermediate portions of said sawing element, said guiding means overlapping both sides of the body of said sawing element and being adapted to enter the cut made by the sawing element, suitable housings adjustably secured to the opposite ends of said guiding means, and means in said housings for driving and guiding said sawing element, substantially as described.

5. A sawing device comprising an endless sawing element having a recessed outer side, and means for supporting and driving the same comprising pulleys over which the looped ends of said sawing element pass, and guiding means adapted to enter the kerf and overlapping the recessed outer sides of the middle laps of said sawing element and holding said middle laps contiguous to one another, whereby they will move in opposite directions in the same kerf.

6. In a sawing device, an endless sawing element having a recessed outer side, and means for supporting and driving the same comprising pulleys carrying the looped ends of said sawing element, and guiding means adapted to enter the kerf and co-operating with the back and recessed outer sides of the middle portions of said sawing element for holding the middle portions of said sawing element flatwise adjacent one another, whereby said middle portions of the sawing element will move in opposite directions in the same kerf.

7. In a sawing device, an endless sawing element having a recessed outer side, and means for supporting and driving the same comprising pulleys carrying the looped ends of said sawing element, housings supporting said pulleys, and guiding means connected to said housings and located between them and adapted to enter the kerf and co-operating with the back and recessed outer sides of the middle portions of said sawing element for holding the middle portions of said sawing element flatwise adjacent one another whereby said middle portions will move in opposite directions and in the same kerf.

8. In a sawing device, an endless sawing element having a recessed outer side, and means for supporting and driving the same comprising pulleys carrying the looped ends of said sawing element, housings surrounding said pulleys and the portions of the sawing element carried thereby, and guiding means connecting said housings and extending between the middle portions of the sawing element and co-operating with the back and recessed outer sides thereof, for holding the middle portions of said sawing element flatwise adjacent one another whereby said middle portions will move in opposite directions in the same kerf.

9. A sawing device of the character referred to comprising an endless saw made of pivotally connected saw sections, means for supporting and driving said endless saw, and side plates overlapping their opposite sides for holding the middle portions of said saw flatwise together, whereby the laps of said saw move in opposite directions in the same cut or kerf.

10. An endless saw made up of small sections pivotally interlocked together in the same plane, means at the looped ends of said saw for supporting and driving the same, means overlapping both sides of said saw for holding the intermediate portions of said saw in contiguous relationship in the cut being made, and driving means for driving said saw.

11. An endless saw made up of sections pivotally interlocked together in the same plane, said saw being provided with tooth-receiving openings, a driving sprocket in one loop of said saw, at one end, for driving the same, means for supporting the other end operatively, and means overlapping both sides of said saw whereby the laps of said saw move together flatwise in the same cut, in opposite directions, substantially as described.

12. An endless saw made up of toothed sections pivotally interlocked together in the same plane, supporting and driving sprockets at the opposite ends or loops of said endless saw, said sprocket having interfitting connections with said saw for driving it, and means overlapping both sides of said saw for holding and guiding the intermediate portions or laps thereof together through the same cut in opposite directions.

13. A sawing device of the character referred to comprising an endless sawing element made of pivotally connected saw sections, relatively fixed holding and guiding means through which the intermediate portions of said sawing element move side by side, said holding and guiding means being adapted to enter the cut or kerf made by the intermediate portions of the sawing element, driving and guiding elements in the loops of said endless sawing element, and means for adjustably supporting the same relative to said sawing element and said holding and guiding means.

14. A sawing mechanism of the character referred to comprising in combination, an endless sawing element made of pivotally interlocked saw sections, relatively fixed holding and guiding means for keeping the intermediate portions of said sawing element side by side, suitable housings adjustably connected to the opposite ends of said holding and guiding means, driving and guiding sprockets in said housings for driving said sawing element, and means for connecting a source of power therewith, substantially as described.

15. In a sawing device, an endless sawing element composed of toothed sections arranged end to end with reference to one another, means at the looped ends of said sawing element for supporting and driving the same, and means cooperating with the backs and outer sides of the middle portion of said sawing element for guiding the toothed sections in contiguous relationship in the cut being made.

16. In a sawing device, an endless sawing element composed of toothed sections having recessed outer sides, said sections being arranged end to end with reference to one another, means at the looped ends of said sawing element for supporting and driving the same, and guiding means cooperating with the recessed outer sides of said toothed sections of said sawing element for guiding the toothed sections in contiguous relationship in the cut being made.

17. In a sawing device, an endless sawing element composed of toothed sections having recessed outer sides and channeled inner sides and arranged end to end with reference to one another, means at the looped ends of said sawing element for supporting and driving the same, and guiding means cooperating with the recessed outer sides and the channeled inner sides of the middle portion of said sawing element for guiding the toothed sections in contiguous relationship in the cut being made.

Signed at Los Angeles, California, this 5th day of February, 1920.

ADRIAN G. DE NORTHALL.